(12) United States Patent  (10) Patent No.: US 7,513,438 B2
Mueller                    (45) Date of Patent:    Apr. 7, 2009

(54) CONTROL FOR A HEATING AND/OR COOLING UNIT

(75) Inventor: Carl J. Mueller, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 455 days.

(21) Appl. No.: 11/204,410

(22) Filed: Aug. 16, 2005

(65) Prior Publication Data

US 2007/0040040 A1    Feb. 22, 2007

(51) Int. Cl.
  *G05D 23/12*  (2006.01)
  *G05D 23/00*  (2006.01)
(52) U.S. Cl. .................. 236/1 B; 236/1 C; 236/51; 236/91 E; 165/209; 165/212; 700/277
(58) Field of Classification Search ............ 62/331; 236/1 A, 1 B, 1 C, 78 B, 91 R, 91 E, 91 D, 236/51; 700/277; 165/205, 209, 212
See application file for complete search history.

(56) References Cited

U.S. PATENT DOCUMENTS

| 5,271,558 | A | | 12/1993 | Hampton | 236/49.3 |
| 5,326,027 | A | * | 7/1994 | Sulfstede | 236/51 |
| 5,348,078 | A | | 9/1994 | Dushane et al. | 165/22 |
| 5,595,342 | A | * | 1/1997 | McNair et al. | 236/51 |
| 6,116,512 | A | * | 9/2000 | Dushane et al. | 236/51 |
| 6,449,533 | B1 | * | 9/2002 | Mueller et al. | 700/276 |
| 6,986,469 | B2 | * | 1/2006 | Gauthier et al. | 236/51 |
| 7,293,718 | B2 | * | 11/2007 | Sigafus et al. | 236/11 |
| 2006/0130496 | A1 | * | 6/2006 | Chapman et al. | 62/126 |

* cited by examiner

*Primary Examiner*—Marc E Norman
(74) *Attorney, Agent, or Firm*—Harness, Dickey & Pierce, P.L.C.

(57) ABSTRACT

A climate control system having a heating and cooling unit is provided that includes one or more remote temperature sensors for transmitting sensed temperature, a combustion air blower, a burner, an igniter, a gas valve, a compressor relay and circulating air blower. A control mounted on the heating and cooling unit has a receiver for receiving the transmitted information, a plurality of switching devices for switching power to the combustion air blower, igniter, gas valve and circulating air blower to establish heating operation, and a plurality of switching devices for switching power to the compressor relay and circulation air blower to establish cooling operation. The control responsively controls the plurality of switching devices to establish heating operation where the sensed temperature of at least one remote sensor is below the heating set point, or to establish cooling operation when at a sensed temperature is above the cooling set point.

20 Claims, 2 Drawing Sheets

CONTROL FOR A HEATING AND/OR COOLING UNIT

FIELD OF THE INVENTION

This invention generally relates to a climate control system for providing conditioned air to a space, and more specifically to control of a heating and cooling system utilizing remote temperature sensors within the space.

BACKGROUND OF THE INVENTION

Climate control systems provide conditioned air to various areas within a space requiring heating or cooling to maintain a desired temperature in the space. These systems employ a thermostat that senses temperature in the space and responsively switches power to the heating or cooling unit to establish operation of the system as needed to maintain a comfortable temperature within the space. The thermostat typically includes switching means for providing a heating request signal or cooling request signal to establish operation of the heating or cooling unit. Remote temperature sensors have also been employed to better sense temperature through out the space and communicate sensed temperature to the thermostat. However, such thermostats require routing of low voltage wiring from the heating or cooling unit to where the thermostat is mounted in the space, and further require switching means for establishing connection of low voltage to the heating or cooling unit via the wiring routed to the thermostat. As such, the heating and cooling unit is dependent on the thermostat's switching to initiate heating or cooling operation.

SUMMARY OF THE INVENTION

The present invention relates to a heating and cooling unit for a space, and a control for establishing operation of the heating and cooling unit to provide conditioned air to the space. In one embodiment, the control is mounted on the heating and cooling unit, and is capable of operating the heating and cooling system to maintain a desired temperature in the space independent of a request signal for heating or cooling from a thermostat in the space.

In accordance with one aspect of the present invention, some embodiments of a climate control system having a heating and cooling unit for supplying conditioned air to a space are provided that comprise one or more remote temperature sensors for transmitting one of a sensed temperature for the space, a heating set point temperature, or a cooling set point temperature, wherein the one or more remote sensors are incapable of switching on a heating or cooling system. The climate control system comprises a combustion air blower for providing combustion air to a burner, an igniter for igniting gas, a gas valve for permitting gas flow to a burner to provide for heating operation, a compressor relay for switching power to an outdoor compressor motor for providing cooling operation, and a circulating air blower for circulating conditioned air to the space. The climate control system further comprises a control mounted on the indoor heating and cooling unit having a receiving means for receiving the transmitted information, a plurality of switching means for individually switching power to the combustion air blower, igniter, gas valve and circulating air blower to establish heating operation for heating the space, a plurality of switching means for switching power to the compressor relay and circulation air blower to establish cooling operation for cooling the space, and a microcomputer. The microcomputer provides for receiving the transmitted information and responsively controlling the plurality of switching means to establish heating operation when at least one remote temperature sensor transmits a sensed temperature that is more than a predetermined amount below the desired heating set point temperature, or responsively controlling the plurality of switching means to establish cooling operation when at least one remote temperature sensor transmits a sensed temperature that is more than a predetermined amount above the desired cooling set point temperature.

In accordance with another aspect of the present invention, at least some embodiments comprise a control adapted to be mounted on a heating and cooling unit having a combustion air blower, a gas valve, a compressor relay, and a circulating air blower. The control comprises a receiver means for receiving transmitted information comprising any one of a sensed temperature for the space, a heating set point temperature, or a cooling set point temperature, a switching means in connection with the combustion air blower motor for switching power to the combustion air blower to supply air to a burner, a switching means in connection with the igniter for switching power to the igniter to ignite gas, a switching means in connection with the gas valve for switching power to the gas valve to supply gas to the igniter and burner for providing heating operation, a switching means in connection with the circulating air blower motor for switching power to the circulating air blower motor to establish a first blower speed for providing heated air to a space, a switching means in connection with the compressor relay for switching power to an outdoor compressor motor for providing cooling operation, and a switching means in connection with the circulating air blower motor for switching power to the circulating air blower motor to establish a second blower speed for providing cooled air to a space. The control further comprises a microcomputer in connection with the receiving means and said switching means, where the microcomputer has a program for controlling each switching means to establish heating operation when at least one remote temperature sensor transmits a sensed temperature that is more than a predetermined amount below a desired heating set point temperature, and for controlling each switching means to establish cooling operation when at least one remote temperature sensor transmits a sensed temperature that is more than a predetermined amount above a desired cooling set point temperature.

Further aspects of the present invention will become apparent from the detailed description provided hereinafter. It should be understood that the detailed description and specific examples, while indicating various embodiments and methods of the invention, are for illustration purposes only and are not intended to limit the scope of the invention.

BRIEF DESCRIPTION OF THE DRAWINGS

Corresponding reference numerals indicate corresponding parts throughout the several views of the drawings.

DETAILED DESCRIPTION OF THE INVENTION

Figure 1:
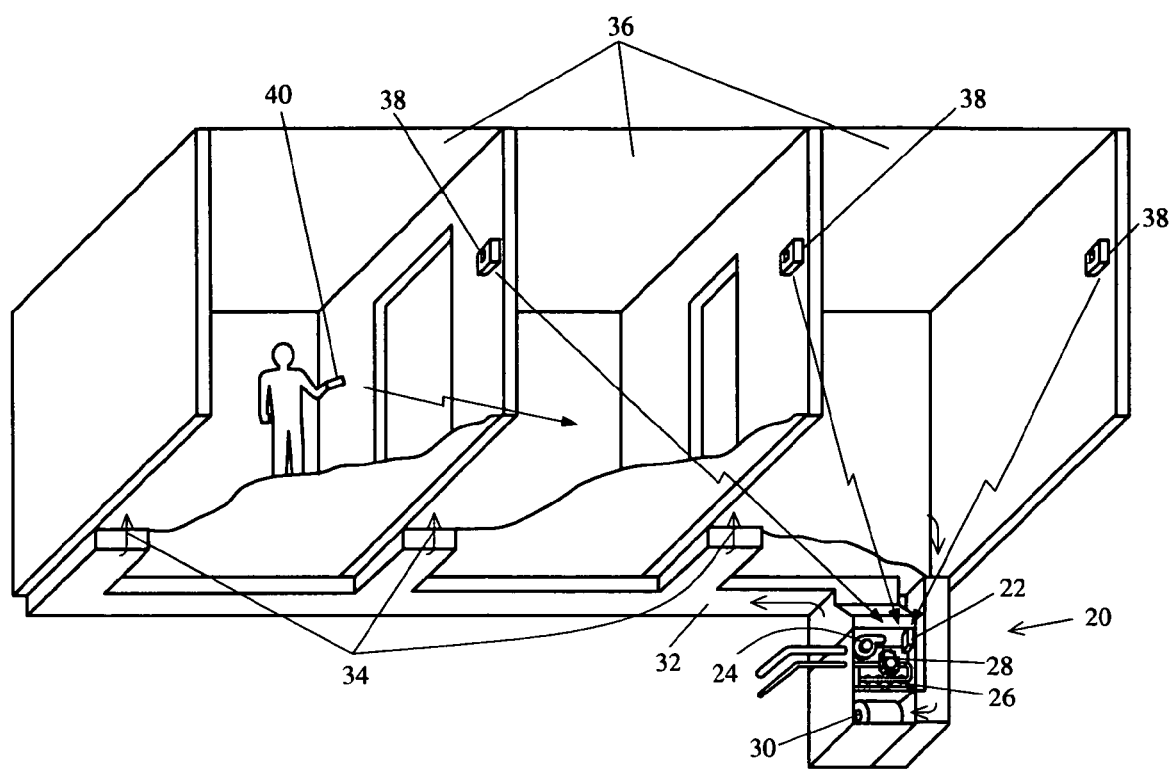
FIG. 1 is a cut away view of a space showing one embodiment of a control for a climate control system in accordance with the principles of the present invention.

One embodiment of a climate control system according to the principles of the present invention is shown in FIG. 1. The climate control system comprises a heating and cooling unit 20 for supplying conditioned air to a space is provided that comprises one or more remote temperature sensors 38 for transmitting one of a sensed temperature for the space, a heating set point temperature, or a cooling set point temperature, wherein the one or more remote sensors 38 are incapable of switching on a heating or cooling system. The climate control system comprises a combustion air blower 24 for providing combustion air to a burner 26, an igniter for igniting gas, a gas valve 28 for permitting gas flow to a burner to provide for heating operation, and a circulating air blower 30 for circulating conditioned air in the space to provide heating operation. The control 22 further comprises a compressor relay for switching power to a compressor motor for providing cooling operation, and a circulating air blower 30 for circulating conditioned air in the space to provide cooling operation. The climate control system further comprises a control 22 mounted on the indoor heating and cooling unit 20 having a receiving means for receiving the transmitted information, a plurality of switching means for individually switching power to the combustion air blower 24, igniter, gas valve 28 and circulating air blower 30 to establish heating operation for heating the space. The control 22 also has a plurality of switching means for switching power to the compressor relay and circulation air blower 30 to establish cooling operation for cooling the space. The heating and cooling unit 20 may accordingly be operated by the control 20 mounted on the unit 20 to maintain a desired temperature in the space independent of a request signal for heating or cooling operation from a thermostat in the space. The control 22 further comprises a microcomputer that provides for receiving transmitted information from the one or more remote temperature sensors 38 and responsively controlling the plurality of switching means to establish heating operation when at least one remote temperature sensor 38 transmits a sensed temperature that is more than a predetermined amount below the desired heating set point temperature. Likewise, the microcomputer responsively controls the plurality of switching means to establish cooling operation when at least one remote temperature sensor 38 transmits a temperature that is more than a predetermined amount above the desired cooling set point.

The one or more remote temperature sensors 38 are configured to sense temperature and transmit a value representative of the sensed temperature of an area within in the space. The remote sensors 38 are preferably battery powered, and wireless transmit information via a radio frequency transmitter. Such wireless remote temperature sensors 38 may transmit temperature information on a periodic basis, or upon sensing a minimum change in sensed temperature to reduce transmission frequency and prolong battery life. The one or more remote temperature sensors may further comprise user input means for adjusting the desired heating set point temperature or desired cooling set point temperature. One example of a wireless remote temperature sensor 38 that is capable of transmitting temperature information is a F0148-1328 remote sensor manufactured by White-Rodgers, a Division of Emerson Electric Co. Such a remote sensor for transmitting information is disclosed in a co-assigned U.S. Pat. No. 6,513,723 entitled "Method and Apparatus For Automatically Transmitting Temperature Information", and is incorporated herein by reference. It should be noted that the one or more remote temperature sensors 38 may alternately be hardwired to a power source, and may transmit information via a wired connection with the control 22.

Figure 2:
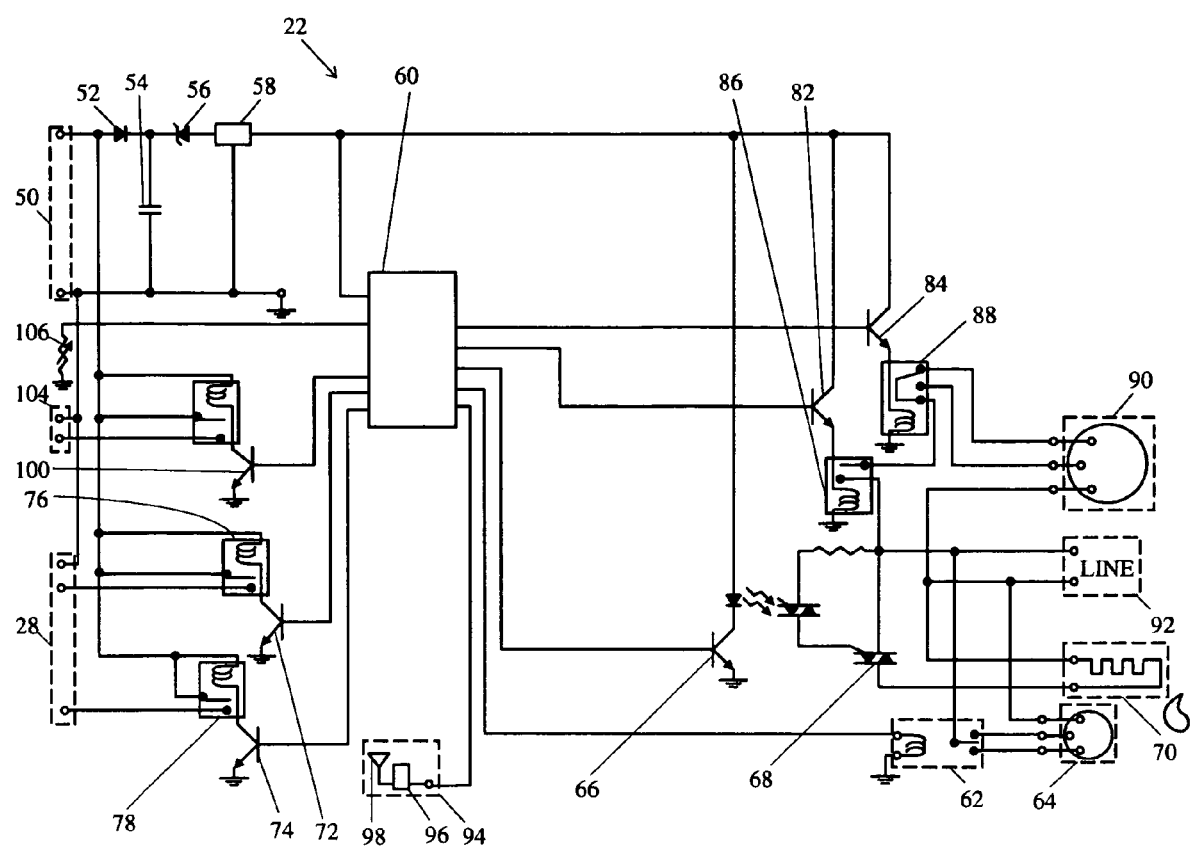
FIG. 2 is a schematic of one embodiment of a control for a heating or cooling unit in accordance with the principles of the present invention.

Referring to FIG. 2, a schematic of one embodiment of a control 22 adapted to be mounted on a heating and cooling unit 20 is shown. The control 22 may be mounted either on the outside or within the heating or cooling unit 20. The control 22 comprises a half-wave regulated 5 volt power supply, which is supplied by a 24 volt alternating current power source 50. The 5 volt power supply preferably comprises a diode 52, a capacitor 54, and a zener diode 56 in series with a voltage regulator 58, but may alternately comprise a transformer or other suitable power supply circuit means.

A microcomputer 60 within the control 22 is in connection with the power supply, and also a relay switching means 62 for switching line voltage to a combustion air blower motor 64 to establish one or more speeds for providing combustion air flow to a burner. The switching means 62 could also be a solid state device suitable for providing switching means, or may alternately comprise a pulse width modulation signal for indicating a desired operating speed for a variable speed blower. The microcomputer 60 is also connected to switching means 66 of an opto-isolator for providing isolated switching of line voltage via triac 68 to an igniter 70 for igniting gas. The microcomputer 60 is also connected to switching means 72 and 74 for respectively actuating relays 76 and 78 for switching power from a low voltage supply 50 to a gas valve 28 to establish gas flow at either a first or second stage of heating. The microcomputer 60 is connected to switching means 82 and 84 for respectively actuating power switching relay 86 and speed selection relay 88 for establishing operation of a circulating air blower motor 90 at one or more speeds during heating or cooling operation. The microcomputer 60 is capable of selectively actuating relay 88 to switch power from line voltage connection 92 to one of two windings, for example, to establish operation of the circulating air blower motor at a first blower speed for providing heated air to the space, or a second blower speed for providing cooled air to the space, or for providing a second stage of heated air to the space. Thus, the microcomputer 60 is capable of responsively controlling the plurality of switching means 62, 66, 68, 72, 74, 82 and 84 to individually switch power to the combustion air blower motor 64, the igniter 70, the gas valve 28, and the circulating air blower motor 90 to establish heating operation. The microcomputer 60 is also in connection with a switching means 100 for switching power to an air conditioner compressor relay 104, in combination with switching means 82 and 84 for actuating relay 88 and switching power to the circulating air blower motor 90 to establish cooling operation.

The control further comprises a receiving means 94 for receiving one of a transmitted sensed temperature for the space, a transmitted heating set point temperature, or a transmitted cooling set point temperature from one or more remote temperature sensors 38 within the space. The receiving means 94 comprises an antenna 98 and a receiver chip 96 for decoding radio frequency transmissions received from the one or more remote temperature sensors. The microcomputer 60 is in connection with the receiving means 94 for receiving sensed temperature transmissions, and has a program for controlling each of the switching means 62, 66, 68, 72, 74, 82 and 84 to establish heating operation when at least one remote temperature sensor 38 transmits a sensed temperature that is more than a predetermined amount below a desired heating set point temperature. The microcomputer 60 then discontinues heating operation when the sensed temperature has increased to within preset amount of the desired heating set point temperature, or has increased above the desired heating set point temperature by a preset amount. Likewise, the program of the microcomputer 60 also controls the switching means 82, 84, 102 and 104 to establish cooling operation when at least one remote temperature sensor 38 transmits a sensed temperature that is more than a predetermined amount above a desired cooling set point temperature. The microcomputer 60 then discontinues cooling operation when the sensed temperature has decreased to within preset amount of the desired cooling set point temperature, or has decreased below the desired cooling set point temperature by a preset amount. In this embodiment, the predetermined amount is in the range of about 0.5° Fahrenheit to 1.5° Fahrenheit, and the preset amount is about 0.5 degrees Fahrenheit or less. The program of the microcomputer 60 may also be adapted to be programmed by a user, for altering the heating set point temperature or cooling set point temperature during various time periods of the day, on various days of the week.

The control 22 may further comprise a wired local temperature sensor 106 extending from the control 22 to the return air duct of the heating and cooling unit 20, which the microcomputer 60 may use for sensing temperature within the space in the absence of transmitted information from the one or more remote temperature sensors 38. This provides a backup in the event that the control 22 does not receive a transmitted sensed temperature within a predetermined time period, which would be exemplary of a low battery condition in the one or more remote temperature sensors 38.

The climate control system may further comprise a hand held remote temperature sensor capable of transmitting a user selected desired heating set point temperature, a user-selected desired cooling set point temperature, and a sensed temperature local to the hand held remote. The hand held remote temperature sensor functions in the same manner as the remote temperature sensors 38, and would further comprise user input means for inputting or adjusting the desired heating set point temperature or the cooling set point temperature. The hand held remote may also comprise user input means for enabling programming of the control 22 for altering the set point temperature during various periods of the day, and various days of the week. The hand held remote sensor is also preferably battery powered, and may be configured to transmit sensed temperature information upon sensing a minimum change in sensed temperature to reduce transmission frequency and prolong battery life.

The advantages of the above described embodiment and improvements should be readily apparent to one skilled in the art, as to enabling control of an indoor heating and cooling unit. Additional design considerations may be incorporated without departing from the spirit and scope of the invention. Accordingly, it is not intended that the invention be limited by the particular embodiment or form described above, but by the appended claims.

What is claimed is:

1. A control adapted to be mounted in a heating and cooling system having a combustion air blower, a gas valve, an igniter, a compressor relay and a circulating air blower, comprising:
    one or more remote temperature sensors incapable of turning on the heating or cooling system, being disposed within a space to be conditioned by a heating and cooling system independent of a thermostat, which one or more remote temperature sensors transmit a value indicative of a sensed temperature;
    a control mounted on a heating and cooling unit that is operated by the control to maintain a desired temperature in the space independent of a request signal for heating or cooling operation from a thermostat in the space;
    a receiver means for receiving transmitted sensed temperature and temperature set point information from one or more remote temperature sensors within the space;
    a plurality of switching means for switching power to the combustion air blower, igniter, gas valve and circulating air blower to establish heating operation;
    a plurality of switching means for switching power to the compressor relay and circulation air blower to establish cooling operation; and
    a microcomputer for receiving transmitted temperature information from the one or more remote temperature sensors and for controlling the plurality of switching means, wherein the microcontroller includes a program that is programmed by a user to establish a heating set point temperature and a cooling set point temperature of the control, where the microcontroller controls the plurality of switching means to establish heating operation, independent of a request signal for heating operation from a thermostat in the space, when at least one remote temperature sensor transmits a sensed temperature that is more than a predetermined amount below a desired heating set point temperature associated with the control, and responsively controls the plurality of switching means to establish cooling operation, independent of a request signal for cooling operation from a thermostat in the space, when at least one remote temperature sensor transmits a sensed temperature that is more than a predetermined amount above a desired cooling set point temperature associated with the control.

2. The control of claim 1 wherein the receiver means receives transmitted information via a wired connection with the one or more remote temperature sensors.

3. The control of claim 1 wherein the receiver means receives transmitted information via wireless radio frequency transmission.

4. The control of claim 1 wherein the microcomputer discontinues heating operation when the difference between the sensed temperature and the desired heating set point temperature is less than a preset amount.

5. The control of claim 1 wherein the microcomputer discontinues cooling operation when the difference between the sensed temperature and the desired cooling set point temperature is less than a preset amount.

6. The control of claim 1 wherein the sensed temperature information, the desired heating set point temperature, and the desired cooling set point temperature are transmitted from a hand held remote temperature sensor.

7. A control system for a heating unit having a combustion air blower, a gas valve, an igniter, and a circulating air blower, being located outside of the space being conditioned by the unit, comprising:
    a space to be conditioned by a heating and cooling system, independent of a thermostat;
    one or more remote temperature sensors that are incapable of turning on the heating or cooling system, which one or more remote temperature sensors are disposed within the space and transmit a value indicative of a sensed temperature;
    a control mounted on a heating and cooling unit that is operated by the control to maintain a desired temperature in the space independent of a request signal for heating or cooling operation from a thermostat in the space;
    a receiver means for receiving information wirelessly transmitted from a remote sensor within the space, which information comprises one of a value indicative of a sensed temperature for a space, a heating set point temperature, or a cooling set point temperature;
    a switching device in connection with the combustion air blower motor for switching on the combustion air blower to supply air to a burner;
    a switching device in connection with the igniter for switching on the igniter to ignite gas;

a switching device in connection with the gas valve for switching on the gas valve to supply gas to the burner for providing heating operation;

at least one switching device in connection with the circulating air blower motor for switching on the circulating air blower motor to establish at least a first blower speed for providing heated air to a space;

a switching device for switching on an outdoor compressor motor for providing cooling operation;

at least one switching device in connection with the circulating air blower motor for switching on the circulating air blower motor to establish at least a second blower speed for providing cooled air to a space; and a microcomputer in connection with the receiving means and said switching devices, the microcomputer comprising a program that is programmed by a user to establish a heating set point temperature and a cooling set point temperature of the control, where the microcontroller controls the switching devices to establish heating operation, independent of a request signal for heating operation from a thermostat in the space, when at least one remote temperature sensor transmits a value indicative of a sensed temperature that is more than a predetermined amount below a desired heating set point temperature of the control, and for controlling the switching devices to establish cooling operation, independent of a request signal for cooling operation from a thermostat in the space, when at least one remote temperature sensor transmits a value indicative of a sensed temperature that is more than a predetermined amount above a desired cooling set point temperature of the control.

8. The control of claim 7 wherein the receiver means receives transmitted information via a radio frequency wireless connection with the one or more remote temperature sensors.

9. The control of claim 7 wherein the receiver means receives transmitted information via wireless radio frequency transmission.

10. The control of claim 7 wherein the microcomputer discontinues heating operation when the difference between the sensed temperature and the desired heating set point temperature is less than a preset amount.

11. The control of claim 7 wherein the microcomputer discontinues cooling operation when the difference between the sensed temperature and the desired cooling set point temperature is less than a preset amount.

12. The control of claim 7 wherein the sensed temperature information, the desired heating set point temperature, and the desired cooling set point temperature are transmitted from a hand held remote temperature sensor.

13. The control of claim 7 further comprising a temperature sensor within the return air ducting of the heating and cooling unit for providing a sensed temperature of the space in the absence of transmitted information from the one or more remote temperature sensors.

14. A climate control system having an indoor heating and cooling unit for providing conditioned air to a space, the climate control system comprising:

a space to be conditioned by a heating and cooling system, independent of a thermostat;

one or more remote temperature sensors that are incapable of turning on the heating or cooling system, being disposed within the space and configured to transmit a value indicative of a sensed temperature;

a control mounted on a heating and cooling unit that is operated by the control to maintain a desired temperature in the space independent of a request signal for heating or cooling operation from a thermostat in the space;

one or more remote temperature sensors within the space for wirelessly transmitting information, which information comprises one of a value indicative of a sensed temperature in the space, a heating set point temperature, or a cooling set point temperature, wherein the one or more remote temperature sensors are not capable of directly switching on the heating or cooling unit;

a combustion air blower for providing combustion air to a burner;

an igniter for igniting gas; a gas valve for permitting gas flow to a burner to provide for heating operation;

a circulating air blower for circulating conditioned air to the space;

a wired local temperature sensor extending from the control to the return air duct of the heating and cooling unit for sensing temperature within the space; and a control mounted away from the space within the indoor heating and cooling unit, the control being capable of receiving the transmitted information and switching on the combustion air blower, igniter, gas valve and circulating air blower to establish heating operation for heating the space, and switching on an outdoor compressor and the circulation air blower to establish cooling operation for cooling the space, wherein the control includes a microcomputer that includes a program that is programmed by a user to establish a heating set point temperature and a cooling set point temperature of the control, where the microcontroller controls switching to establish heating operation, independent of a request signal for heating operation from a thermostat in the space, upon receiving wirelessly transmitted information from at least one remote temperature sensor, or in the absence of temperature information from a remote temperature sensor the wired local temperature sensor, of a value indicative of a sensed temperature that is more than a predetermined amount below the desired heating set point temperature of the control, and responsively controls switching to establish cooling operation, independent of a request signal for cooling operation from a thermostat in the space, upon receiving wirelessly transmitted information from at least one remote temperature sensor, or in the absence of temperature information from a remote temperature sensor the wired local temperature sensor, of a value indicative of a sensed temperature that is more than a predetermined amount above the desired cooling set point temperature of the control.

15. The climate control system of claim 14, wherein control mounted on the indoor heating or cooling unit establishes heating or cooling operation independent of a heating or cooling signal from a thermostat within the space.

16. The climate control system of claim 15, wherein the one or more remote temperature sensors comprise input means for enabling user-selection of a desired heating set point temperature or a desired cooling set point temperature.

17. The control of claim 16 wherein the one or more remote temperature sensors transmit information via wireless radio frequency transmission, and the receiver means of the control is capable of receiving wireless radio frequency transmissions.

18. The control of claim 17 wherein the microcomputer discontinues heating operation when the difference between the sensed temperature and the desired heating set point temperature is less than a preset amount.

19. The control of claim 18 wherein the microcomputer discontinues cooling operation when the difference between the sensed temperature and the desired cooling set point temperature is less than a preset amount.

20. The climate control system of claim 14 further comprising a hand held remote temperature sensor capable of transmitting a user selected desired heating set point temperature, a user-selected desired cooling set point temperature, and a sensed temperature local to the hand held remote.

* * * * *